July 23, 1968 R. G. DE WITT 3,394,223

DATA TRANSMISSION

Filed Dec. 21, 1964 3 Sheets-Sheet 1

INVENTOR
R. G. DE WITT
BY
[signature]
ATTORNEY 3,394,223
Patented July 23, 1968

3,394,223
DATA TRANSMISSION

Russell G. De Witt, Berkeley Heights, N.J., assignor to Bell Telephone Laboratories, Incorporated, New York, N.Y., a corporation of New York
Filed Dec. 21, 1964, Ser. No. 419,824
4 Claims. (Cl. 178—50)

ABSTRACT OF THE DISCLOSURE

A data transmission system for transmitting binary data from a source such as a data tape to a utilization device. The data is first stored until the occurrence of the channel allocated for its transmission. At the receiver, the received data characters are stored in a plurality of stores and the quantity of data stored is measured. Discrete delays, proportional to the measured quantity of data stored, are inserted between data characters read out of the stores so that the data characters are read out at the average rate at which they occurred at the source.

Figure 1:
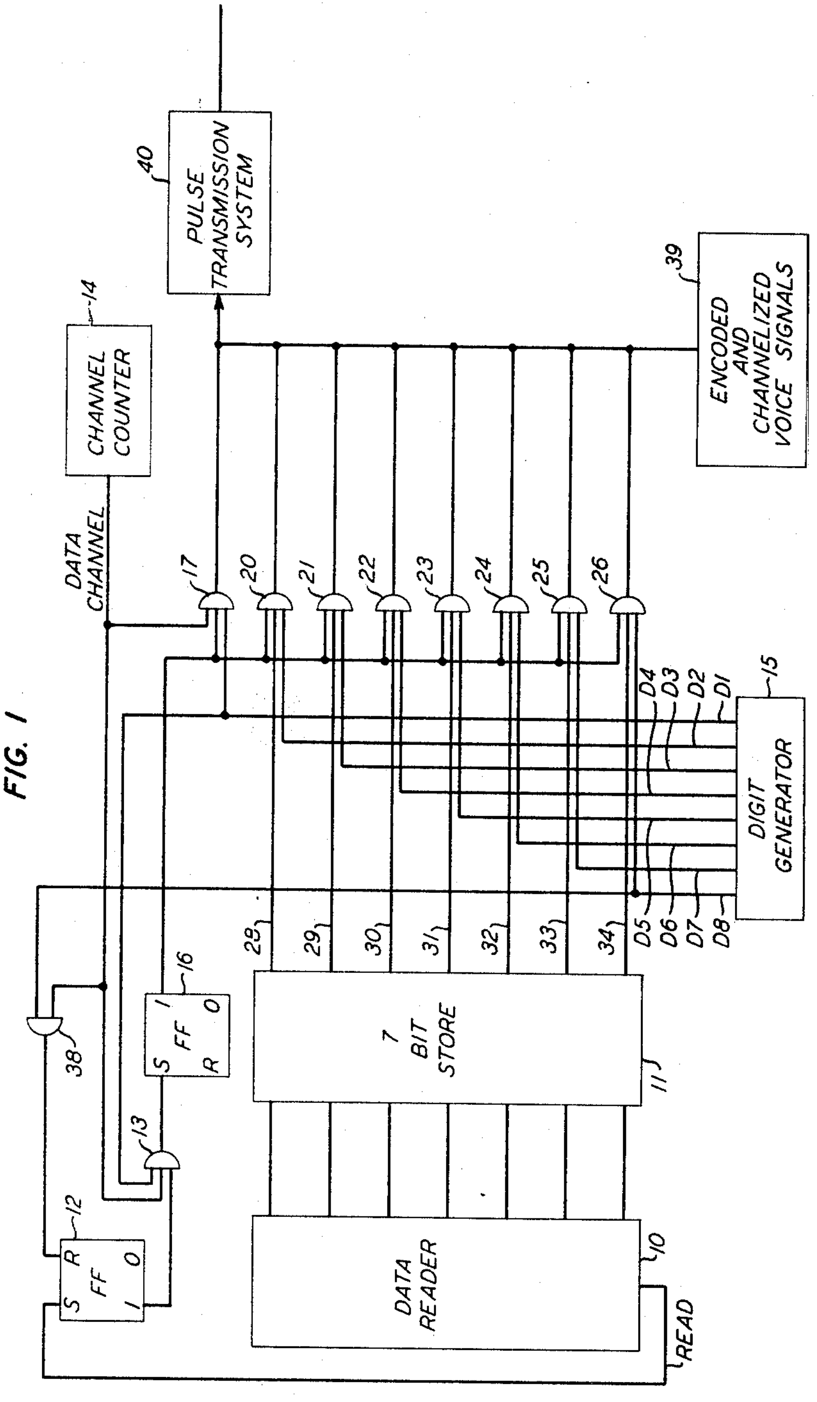

This invention relates to data transmission and particularly to the transmission of nonsynchronous binary data over a selected channel of a synchronous time division multiplex pulse transmission system.

The pulse transmission system described in the January 1962, issue of the Bell System Technical Journal by C. G. Davis in "An Experimental Pulse Code Modulation System for Short-Haul Trunks," pages 1–24, and by J. S. Mayo in "A Bipolar Repeater for Pulse Code Modulation Systems," pages 1–27, appears to be ideally suited for transmission of data from one source, such as a data tape, to a distant store or utilization device, since it already transmits information in digital form. Such transmission is not easily accomplished in an economical manner, however, due to the great difference in the information carrying capacity of the transmission system and the speed of the data tape. The pulse transmission system described in the above-mentioned articles in the Bell System Technical Journal provides for the transmission of 24 voice channels. The signals present in each channel are sampled in a recurring sequence, and one sample from each channel, or 24 samples, are encoded and transmitted every 125 microseconds. Each sample is encoded into a digital signal occupying 7 time slots, with an additional time slot allocated for signaling information. Since each encoded sample, including any signaling, occupies 8 time slots, the 24 samples require a total of 192 time slots for transmission over the system. An additional, or 193rd, time slot is added to permit synchronizing or framing the transmitter and receiver of the system, and these 193 time slots comprise a framing period. There are 8,000 such periods or frames each second, and the repetitive rate of pulses on the transmission system is 1.544 million pulses per second. Since one time slot in every channel is usually allocated for signaling, each channel of the pulse transmission system is capable of transmitting 56 kilobits per second, which capacity is generally enough to handle data from a single commercial data tape source.

Typically commercially available data equipment uses a data tape which employs 7 tracks of information so that 7 bits appearing in parallel across the data tape comprise a data character. The speed of the tape is quoted in terms of characters per second, and the maximum speed presently obtainable with commercially available equipment is approximately 62.5 kilocharacters per second. Most commercial data tape machines, however, operate at considerably slower speeds and can be accommodated by the 56 kilobits per second of the single channel of the above-described pulse transmission system.

Thus, it is desired that data from a single data source be transmitted over a single channel of the pulse transmission system with those channels of the system not used for the transmission of data being made available for voice transmission by subscribers or the transmission of data from other sources.

It is an object of this invention, therefore, to transmit binary data from a source such as a data tape to a utilization device over one or more channels of the regenerative pulse transmission system, the remaining channels of the system being employed for the transmission of voice signals from subscribers or data from other sources.

The copending application of C. G. Davis and L. C. Thomas, Ser. No. 332,152, filed on Dec. 20, 1963, now U.S. Patent No. 3,335,222, discloses apparatus for transmitting data over one or more channels of a regenerative pulse transmission system and also reproduces at the receiving terminal the instantaneous rate at which data were applied to the transmitting terminal. It has been found, however, that such reproduction of the instantaneous data rate is usually unnecessary since no information is usually transmitted in the spacing of the data characters themselves. In addition, such faithful reproduction of the data rate may, in fact, be undesirable as, for example, where the peak rate of the transmitting equipment exceeds the peak rate of the data handling equipment at the receiving terminal. In such a situation if the average data handling capability of the equipment at the receiving terminal is equal to the average rate at which data are transmitted, it is much more desirable to reproduce the data at the receiving terminal at the average rate at which it was transmitted.

Such a data transmission system, wherein the average data rate is reproduced at the receiver to smooth out the data peaks and permit the use of equipment which could not otherwise handle data received at the peak rate, is disclosed in the copending application of C. G. Davis and L. C. Thomas, Ser. No. 402,505, filed on Oct. 8, 1964, now U.S. Patent No. 3,353,158. In this latter application two embodiments are disclosed. In a first, short term average data rates are determined by counting the number of frames required to supply a predetermined number of channels of data (K), and reading out the first channel of data to the subscriber upon the reception of the $(K+1)$th channel of data. The second data character is read out at such time after the readout of the first data character as to correspond to the number of frames that were transmitted before $K+1$ data characters were received. A continuation of this procedure results in data smoothing so that the average data rate is recovered by examining the fill of the transmission channels at the receiver without the necessity of sending any rate information over the transmission line. The resulting apparatus required at the receiving terminal, however, is extremely complex.

In a second embodiment shown in copending application Ser. No. 402,505, now U.S. Patent No. 3,352,158 considerably simpler apparatus is required at the receiving terminal, but it is necessary to transmit an initial signal to the receiving terminal indicative of the average rate of data transmission, and this information is used to set the frequency of a clock which serves to read out the data. Storage registers are provided, and by monitoring the fill of the storage registers at the receiving terminal, the initial information about the average data rate may be monitored. In essence, this system determines the short term average data rate of the received data characters, and the readout rate as determined by the frequency of the clock source is modified in accordance with such determinations so that the data are read out at a rate equal to the average data rate.

The latter technique disclosed in the above-mentioned application Ser. No. 402,505, now U.S. Patent No. 3,353,158 requires relatively little apparatus at the receiving terminal and is satisfactory in data transmission systems where the data rate is not highly variable. Where the data rate is highly variable the ability to change the frequency of the clock at the receiving terminal becomes significant. The clock has a Q associated with it so that instantaneous change in its frequency is, of course, not possible. Thus, for example, if data characters should be received with great rapidity the clock may not have sufficient time to speed up and read out the data characters so that some of the data characters will be lost due to the inability to store all the received data characters at the receiving terminal.

It is therefore an object of this invention to not only transmit binary data over one or more channels of the regenerative pulse transmission system but to reproduce with relatively simple and inexpensive receiving apparatus the data at the approximate average data rate at which it was applied to the transmitting terminal.

It is a further object of this invention to eliminate the need for a clock source at the receiving terminal to govern the readout of the data, while at the same time permitting the use of relatively simple receiving apparatus.

It is a further object of this invention to eliminate the need for transmitting a signal to the receiving terminal prior to the transmission of data to indicate to the receiving terminal equipment the average rate at which data will be received.

In accordance with this invention binary data from a data source such as a data tape are transmitted over a predetermined channel of the regenerative pulse transmission system by storing a data character until the occurrence of the channel allocated for the transmission of data, transmitting the data character at the pulse repetition frequency of the transmission system in the data channel, storing the received data characters in a plurality of stores at the receiving terminal, measuring the number of data characters stored in the stores, and introducing discrete delays in the readout of each data character in accordance with the number of characters stored at the receiver so that the data characters are read out at the average rate at which they occurred at the source. Since no clock is employed at the receiving terminal, there is no inertia present in the system and the only delays present are the relatively small ones introduced by high speed switching apparatus which serves to insert various delay paths into the readout of the data characters. Thus, the data are read out at the average rate at which it is received while at the same time the readout rate may be instantaneously changed to accommodate extremely rapid changes in the data rate.

Figure 2:
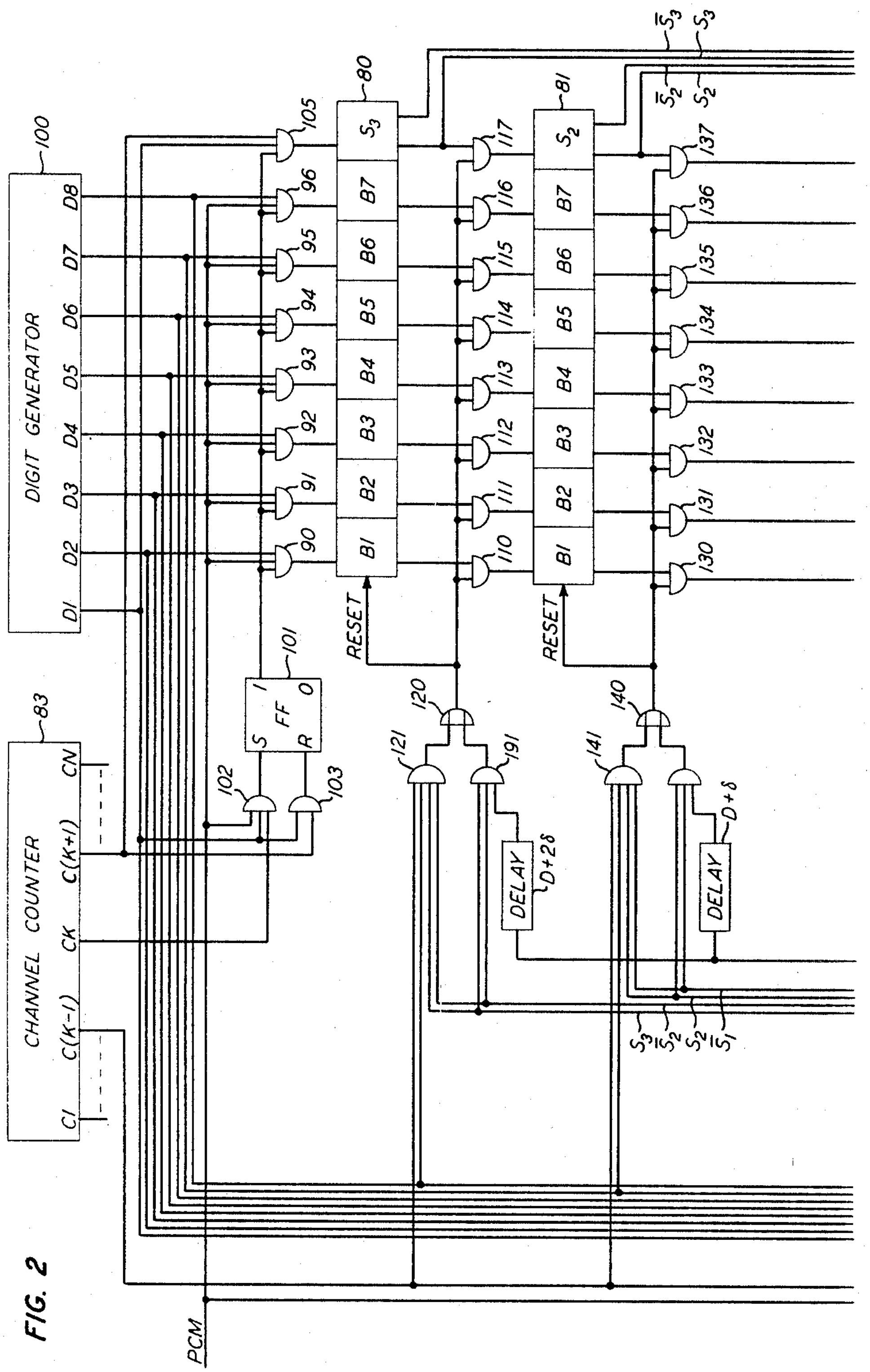
Figures 3, 4:
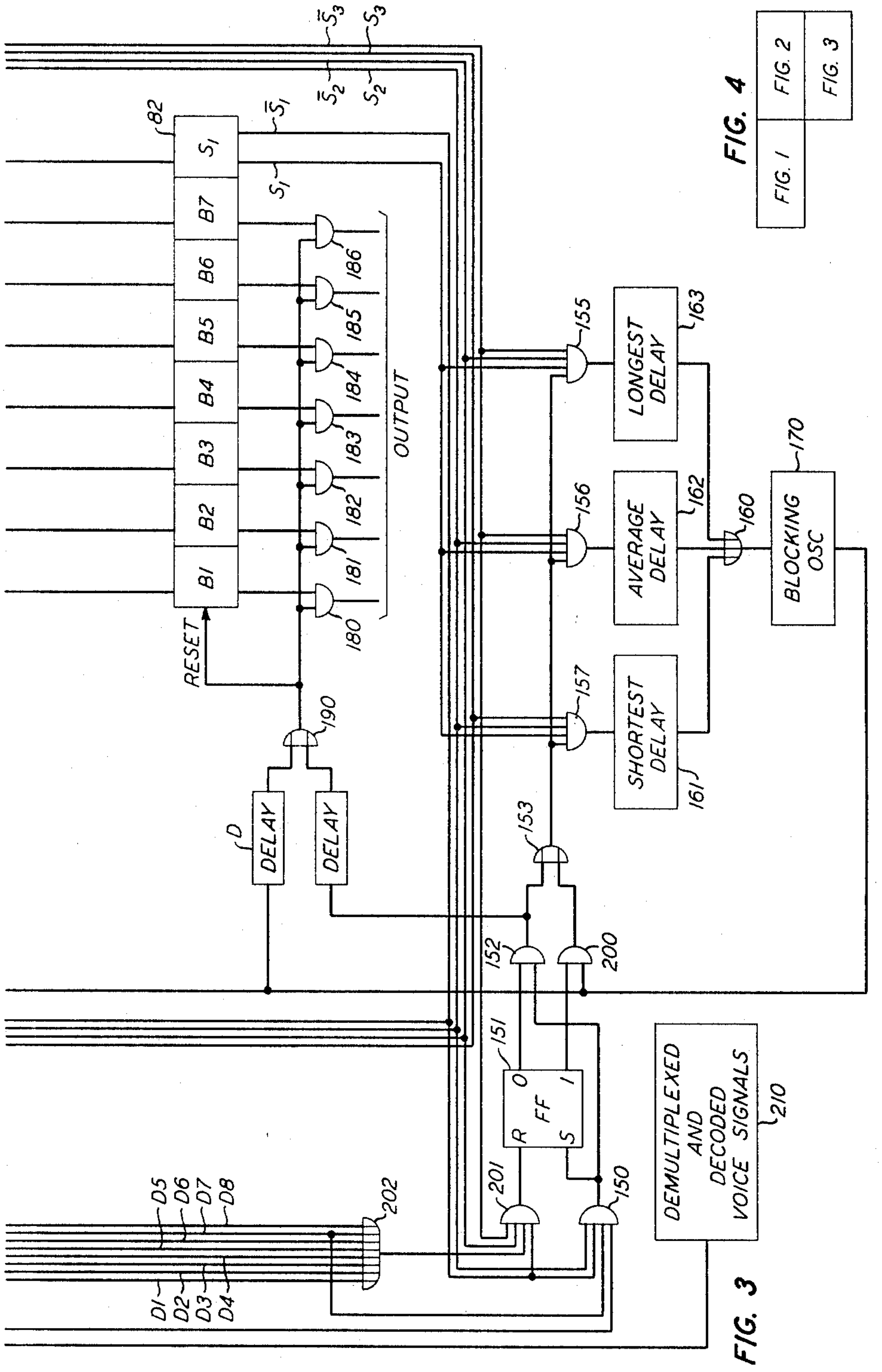

This invention will be more fully comprehended from the following detailed description taken in conjunction with the drawing, in which:

FIG. 1 represents in block diagram form a transmitting terminal embodying this invention; and FIGS. 2 and 3, arranged as shown in FIG. 4, are a block diagram of a receiving terminal embodying this invention.

In the transmitting terminal of the embodiment of the invention shown in FIG. 1, a data character is read from a data tape and stored until the occurrence of the next data channel, i.e., the channel allocated for the transmission of data, whereupon the data character is read out in the second through eighth time slots of the data channel, with a mark inserted in the first time slot of the data channel to indicate that a data character is to follow. To accomplish such timely readout and signaling, use is made of the digit generator and channel counter found at which terminal of the pulse transmission system described in the above mentioned articles. The channel counter at the transmitting terminal is used to multiplex seven-bit characters on to the twenty-four channels and for this purpose counts to twenty-four eight thousand times each second, producing twenty-four control pulses which sequentially appear on each of its output terminals for each such count. Each output terminal is associated with a particular channel so that encoded samples to be transmitted in a particular channel are transmitted only upon the occurrence of a pulse at the output terminal of the counter associated with that channel. In conjunction with the channel counter a digit pulse generator is employed to insert the encoded voice signals and any signaling into the eight time slots which make up a channel. For this purpose the digit generator generates eight pulses which sequentially appear on each of eight output terminals D1 through D8 during the eight time slots of each channel in each frame. During the occurrence of the data channel following the storage of a data character, the output of the channel counter and the output pulses from the digit generator combine to insert a mark in the first time slot of the data channel and the stored data character in the second through eighth time slots.

More specifically, with reference to FIG. 1, data are read from a data tape by a data tape reader 10 which has seven output terminals at which appear the seven bits of data which make up a data character. The data reader may be that described in International Business Machines Customer Engineering Reference Manual, Tape Adapter Unit, January 1961, copyright 1961, by International Business Machines Corporation. These seven parallel bits of data are in turn applied to a seven-bit store 11, and when the data have been so applied the reader 10 generates a read signal which is applied to set a bistable circuit 12. As is frequently done by those skilled in the art, all bistable circuits will be conveniently shown in block diagram form with four terminals S, R, 1 and 0. A signal applied to the S terminal is understood to mean that the bistable device will then be "set" producing a reference voltage at the "1" terminal and a ground voltage at the "0" terminal. Conversely, a signal applied to the "R" terminal produces a reference voltage at the "0" terminal and a ground voltage at the "1" terminal, and the bistable device is then said to be "reset."

The read signal sets bistable circuit 12 whose "1" output terminal is connected to one input terminal of a three input terminal AND gate 13. The other two input terminals of AND gate 13 are connected to the data channel output terminal of the channel counter 14 and the D1 output terminal of the digit generator 15, respectively, so that when a data character has already been stored the occurrence of the first time slot of the next occurring data channel produces an output pulse from AND gate 13 whose output terminal is connected to set bistable circuit 16 and produce a reference voltage at its "1" output terminal.

The function of the voltage so generated at the "1" output terminal of bistable circuit 16 is to generate a mark in the first time slot of the data channel to indicate to the receiver that a data character will be transmitted in the data channel of that frame and also to enable circuitry which serially transmits the data character. To accomplish the former purpose the "1" output terminal is connected to one input terminal of a three input terminal AND gate 17, whose other two input terminals are connected to the data channel output terminal of the channel counter 14 and the D1 output terminal of digit generator 15. As a result, during the first time slot of the data channel AND gate 17 generates a reference voltage at its output terminal which is directly applied to the pulse transmission system and a mark is transmitted indicating that a data character is to follow.

The "1" output terminal of bistable circuit 16 is also connected to one input terminal of each of seven transmission gates 20 through 26 to prepare those gates to conduct during the second through eighth time slots. A second input terminal of each transmission gate 20 through 26, respectively, is connected to one output terminal 28 through 34, respectively, of store 11 while the third input terminal of each gate is connected to one of the output terminals D2 through D8, respectively, of digit generator 15. Each transmission gate 20 through 26 is then sequentially actuated during the second through eighth time slots of the data channel so that the data character stored in store 11 is applied to the transmission line during these time slots.

Upon the termination of the data channel, bistable circuits 12 and 16 are reset by the output signal from a two input terminal AND gate 38, one of whose input terminals is connected to the data channel output terminal of counter 14 and the other to the D8 output terminal of generator 15. Transmission gates 17 and 20 through 27 are thus disabled since the voltage at the "1" output terminal of bistable circuit 16 is now at ground potential.

The voice signals are encoded and transmitted over the proper channels by means of the techniques described for such transmission in the above-mentioned articles in the Bell System Technical Journal. This process of encoding and preparing the voice signals for transmission is indicated in block diagram form in FIG. 1 by the circuit 39 designated by the nomenclature "Encoded and Channelized Voice Signals."

The receiving terminal of a transmission system embodying this invention is shown in FIGS. 2 and 3 arranged as shown in FIG. 4. Three stores 80, 81, and 82 are provided, and a data character is initially read into store 80 under the control of a signal generated in response to the mark in the first time slot of a first data channel containing a data character. The first data character remains stored in store 80 until the next occurrence of the last time slot of the channel immediately preceding the data channel. For purposes of explanation the output terminals of the channel counter 83, which is found at the receiving terminal of the transmission system described in the above-mentioned articles in the January 1962 issue of the Bell System Technical Journal, are designated $C_1$ through $C_N$ with the data channel being denoted $C_K$ and the immediately preceding and succeeding channels denoted $C_{K-1}$ and $C_{K+1}$, respectively. Thus, upon the occurrence of the eighth time slot of channel $C_{K-1}$ the data stored in store 80 will be read into store 81 provided that store 81 does not already contain a data character. Should store 81 already contain a data character, no shifting of the data characters occurs until the occurrence of an output signal from associated measuring apparatus, to be described below, which output signal is generated at discrete time intervals determined by the number of data characters stored in stores 80 through 82. Similarly, when a data character is stored in store 81 it is transferred to store 82 during the seventh time slot of the channel immediately preceding the data channel provided that no data character is stored in store 82. In the event that data are stored in store 82 such transfer does not take place until the generation of a signal from the above previously mentioned associated measuring apparatus which serves to read the data character stored in store 82 out to the receiving data equipment at the proper time interval.

In somewhat more detail, a first data character is read into store 80 and thence transferred to stores 81 and 82 during the next two occurrences of channel $C_{K-1}$. When the first received data character is transferred to store 82, a signal is simultaneously generated to activate the above-mentioned associated measuring apparatus which functions to ascertain the amount of data stored in stores 80, 81, and 82. This associated measuring apparatus, which examines the number of data characters stored at the receiving terminal, then generates a signal at a discrete time following the transfer signal which transferred the first data character from store 81 to store 82. The elapsed time between transfer of the first data character to store

82 and the generation of a signal by the measuring apparatus is a measure of the short term average data rate. The signal generated by the measuring apparatus governs the readout of all data characters, save the first received character, from store 82. The first received data character is read out as soon as the measuring apparatus has made the first measurement.

This signal generated by the measuring apparatus is also applied to gating means connected between stores 80 and 81 and 81 and 82 so that a data character stored in store 81 will in response to the generated signal from the measuring apparatus be transferred to store 82 and a data character stored in store 80 will be transferred to store 81. This latter action, however, will not take place until after the reception of the next data channel so that preceding the transfer initiated by the measuring apparatus the normal transfer during channel $C_{K-1}$ will take place, followed by the transfer due to the signal generated by the measuring apparatus. In addition, the signal generated by the measuring apparatus is fed back to reinitiate the measuring process so that after these transfers have taken place another measurement of the number of data characters stored at the receiving terminal is made. This process continues until no further data characters are received and the measuring apparatus is disabled upon the recognition that no data characters are stored at the receiving terminal.

Because the readout to the receiving data equipment of the subscriber, of all data characters save the first, is determined by the generation of a signal having a predetermined delay from the signal which transfers a data character into store 82, the discrete time spacing between data characters may be instantaneously determined. That is to say, one or more of the series of $n$ delay circuits, where $n$ is equal to the number of data characters, may be employed to govern the time of readout and these delays may be instantly determined and varied. This is in contrast with the employment of a data clock in the second embodiment of copending application Ser. No. 402,505 wherein the frequency of the clock may not be instantly varied since there is a certain amount of inertia inherent in it. Because of the ability to instantaneously determine and insert discrete spacings between the data characters in the present invention, apparatus in accordance with the present invention is able to accommodate the reception of a data signal having a highly varying data rate whereas the above-mentioned apparatus described in the copending application may not be able to do so, since it requires a finite period of time to change the frequency of the data clock. During that finite period of time in which it may be necessary to rapidly increase the speed of the clock to accommodate rapidly received data characters, data characters may be lost while the data clock's frequency is being made to increase.

More specifically, the receiving apparatus shown in FIGS. 2 and 3 functions in the following manner. The transmitted signal is applied to one input terminal of each of a series of three input terminals of AND gates 90 through 96. A second input terminal of each AND gate 90 through 96, respectively, is connected to a respective one of the output terminals D2 through D8 of digit generator 100 forming part of the receiving terminal of the pulse transmission system, while a third input terminal of each AND gate 90 through 96 is connected to the "1" output terminal of a bistable circuit 101. The function of the bistable circuit 101 is to generate a voltage at its "1" output terminal in response to the mark present in the first time slot of a data channel containing data. To accomplish this, bistable circuit 101 is set by an output signal appearing at the output terminal of AND gate 102 during that predetermined time slot since the three input terminals of AND gate 102 are connected to receive the transmitted signal, the D1 output terminal of digit generator 100, and the $C_K$ output terminal of channel counter 83. The reference voltage at the "1" output terminal of bistable circuit 101 is present between the first time slot of a data channel containing data and the first time slot of the succeeding channel $C_{K+1}$, since the bistable circuit 101 is reset in response to a voltage generated by AND gate 103 during the first time slot of channel $C_{K+1}$. Thus, a transmitted data character is read into store 80 through gates 90 through 96.

Each of the eight-bit storage registers 80, 81, and 82 comprises eight bistable circuits. The first seven of these, denoted B1 through B7, respectively, are used for storage of the data characters. Thus, the output terminals from AND gates 90 through 96 are applied to the input terminals of bistable circuits B1 through B7 of register 80. In addition, each storage register has an eighth bistable circuit. It is in this eighth bistable circuit that the mark generated in the first time slot of a data channel containing a data character is stored. For example, the "1" output terminal of bistable circuit 101 is applied to one input terminal of a three input terminal AND gate 105. This input signal to AND gate 105 is indicative of a mark in the first time slot of a data channel. This mark is read into the eighth bistable circuit, designated $S_3$ of storage register 80 during the first time slot of the channel immediately succeeding the data channel so that a mark appears at the $s_3$ output terminal of bistable circuit $S_3$ in register 80 and a space appears in the $\bar{s}_3$ output terminal. The two output terminals of each of the bistable circuits $S_3$, $S_2$, and $S_1$ of registers 80, 81, and 82, respectively, are shown in the drawings. A first output terminal of each of these bistable circuits is denoted, for example, $s_3$ while the second output terminal of the same bistable circuit is denoted $\bar{s}_3$. This nomenclature means that when a mark is stored in the bistable circuit a reference voltage appears at the output terminal $s_3$ and a space appears at the output terminal denoted $\bar{s}_3$. When no mark is stored in the register there is a reference voltage at the output terminal $\bar{s}_3$ and a ground or no voltage at output terminal $s_3$.

The first received data character and the mark pulse in the first time slot are, as discussed above, stored in storage register 80. Upon the occurrence of the eighth time slot of channel $C_{K-1}$, that is, the channel immediately preceding the data channel, the data character stored in store 80 and the mark pulse in the first time slot are transferred to store 81 provided that store 81 does not already contain a data character. To accomplish this end, AND gates 110 through 117 are provided. One input terminal of each AND gate 110 through 117 is connected to a respective one of bistable circuits B1 through B7 and output terminal $s_3$ of storage register 80. A second input terminal of each of the AND gates 110 through 117 is connected to the output terminal of OR gate 120, one of whose input terminals is connected to the output of a four input terminal AND gate 121. AND gate 121 is enabled during the eighth time slot of channel $C_{K-1}$ provided that a mark is present in bistable circuit $S_3$ of storage register 80 and no mark is present in bistable circuit $S_2$ of store 81. Thus, four input signals are applied to AND gate 121. They are the $C_{K-1}$ output terminal of channel counter 83, the D8 output terminal of digit generator 100, the signal at the $\bar{s}_2$ output terminal of storage register 81, and the signal at the $s_3$ output terminal of storage register 80. When register 80 contains a data character and register 81 does not, reference voltages are present at the $\bar{s}_2$ and $s_3$ terminals, respectively, and AND gate 121 is enabled during the eighth time slot of channel $C_{K-1}$. As a result, the data character stored in store 80 is transferred to store 81, and in addition the output signal from OR gate 120 resets storage register 80.

Similarly, the first data character now stored in store 81 is transferred to store 82 together with the mark pulse in the bistable circuit $S_2$ provided that storage register 82 does not contain a data character. AND gates 130 through 137 function in the same manner as AND gates 110 through 117, respectively, and they are enabled by OR gate 140 and AND gate 141 which function similarly to OR gate 120 and AND gate 121, respectively. The actual transfer from register 81 to register 82 of the first received data character takes place during the seventh time slot of channel $C_{K-1}$ provided that no data are stored in register 82. Thus, the first received data character is initially read into store 80 and thence into stores 81 and 82.

Simultaneously with the generation of an output pulse by AND gate 141, AND gate 150, which is identical to AND gate 141 in terms of the input signals applied thereto, generates an output signal to set bistable circuit 151 which is initially in the reset condition. The output signal from AND gate 150 is also applied to one input terminal of AND gate 152 while a signal from the "0" output terminal of initially reset bistable circuit 151 is applied to the second input terminal of AND gate 152.

Prior to the setting of bistable circuit 151, therefore, AND gate 152 generates an output pulse. This output pulse enables OR gate 153 whose output signal immediately enables three AND gates 155, 156, and 157, respectively, which constitute the above-mentioned measuring apparatus which determines the number of data characters stored at the receiving terminal. Each of these AND gates 155, 156, and 157 has three other input terminals which are connected to the $S_1$, $S_2$, and $S_3$ bistable circuits of storage registers 82, 81 and 80, respectively. When all three of these registers 80, 81, and 82 contain data characters, AND gate 157 which is connected to receive the signals from terminals $s_1$, $s_2$, and $s_3$ of bistable circuits $S_1$, $S_2$, and $S_3$, respectively, is enabled. Similarly, when storage registers 81 and 82 contain data and register 80 contains no data chareacter, AND gate 156 is enabled since is is connected to receive the signals from terminals $\bar{s}_3$, $s_2$, and $s_1$ of bistable circuits $S_3$, $S_2$, and $S_1$. Finally, when storage register 82 alone contains a data character AND gate 155 is enabled.

Each of the AND gates 155, 156, and 157 is connected through a delay circuit to an OR gate 160. Delay circuit 161 associated with AND gate 157 has a delay which is longer than the interval of time between data channels, i.e., longer than a frame of the transmission system. Delay circuit 162 connected in series between OR gate 160 and AND gate 156 provides a delay equal to a delay approximately equal to that which would occur between data characters transmitted at the average rate of the data character transmission and which is somewhat longer than the delay provided by delay circuit 161. Similarly, delay circuit 163 provides a somewhat longer delay than delay circuit 162. Thus, after an appropriate delay determined by the number of data characters stored in the receiving apparatus OR gate 160 generates a signal which is shaped by blocking oscillator 170 and applied to the AND gates 110 through 117, 130 through 132, and AND gates 180 through 186, the latter gates being provided to read the data out of register 82 to the subscriber.

Initially, after, the determination of which of the storage register 80, 81, and 82 contain data, the first data character is read out of register 82 under the control of a delayed output signal from AND gate 152 applied to AND gates 180 through 186 by means of OR gate 190. Since the shortest delay is that provided by delay circuit 161, and this delay is greater than the framing period of the transmission line, any data characters stored in storage registers 80 and 81 are moved to succeeding registers, after the readout of the first data character, under the control of AND gates 121 and 141 as previously described. Thus, any data characters stored in storage registers 80 and 81 are transferred to registers 81 and 82, respectively. Following this transfer the signal generated by blocking oscillator 170, as a result of AND gates 155, 156, or 157 being enabled, is applied to OR gates 120, 140, and 190 to continue the transfer of data characters through the storage registers and to read out the second data character at such time after the first as determined by whether delay circuit 161, 162, or 163 has generated the pulse. Thus, the output of blocking oscillator 170 is applied to OR gate 120 through AND gate 191 after a delay $D+2\delta$. AND gate 191 is enabled by this signal only if the marking pulse is stored in bistable circuit $S_3$ of register 80 and no marking pulse is stored in $S_2$ of register 81. Similarly, a data character stored in register 81 is transferred to register 82 by the output of the blocking oscillator after a somewhat shorter delay $D+\delta$ provided that a data character is not stored in register 82. Finally, the output signal from blocking oscillator 170 reads the second and succeeding data characters out of store 82 after a delay D by actuating AND gates 180 through 186 through OR gate 190.

Thus, the sequence of operation is the following: The first received data character is stored in store 80 and thence read successively into stores 81 and 82. When the first data character is read into store 82 an examination is made as to whether data characters have been transmitted in the immediately two succeeding data channels by examining whether a data character is stored in stores 80 and 81. A determination is made by AND gates 155, 156, and 157 as to the number of data characters stored at the receiving terminal, and a signal is generated, after a suitable delay, which is used to read the next data character out of store 82 and transfer storage data characters from a first storage register to a succeeding storage register. The first data character is read out of store 82 to the subscriber after this initial determination of data storage has been made, and data characters are transferred from store 80 to store 81 to store 82 in the interim period between the readout of the first data character and the generation of a control pulse by blocking oscillator 170 under the control of AND gates 121 and 141. Further transfer of data characters from store 80 to 81 to 82 then takes place under the control of the signal generated by blocking oscillator 170 which also controls the readout of all data characters from store 82.

The output signal from blocking oscillator 170 is also applied through AND gate 200 and OR gate 153 to enable AND gates 155, 156, and 157. Thus, after each transfer of a data character from a store to the next succeeding store under the control of blocking oscillator 170, AND gates 155, 156, and 157 are again enabled to measure the number of data characters stored at the receiving terminal. In response to this measurement, further signals are generated, which are delayed from the preceding readout signal applied to OR gate 190 by blocking oscillator 170, by a discrete time determined by one of the delay circuits 161, 162, or 163 so that data are read out to the subscriber at the average rate at which it was received. In addition, and most important, is the fact that the time between the data characters may be instantaneously varied since there is no delay inherent in switching to the delay provided by one delay circuit or the other.

When all the data characters received have been read out of the stores, AND gate 201 which is connected to the $\bar{s}_1$, $\bar{s}_2$, $\bar{s}_3$ output terminals of registers 82, 81, and 80, respectively, and to all the digit output terminals by means of OR gate 202, is enabled. The output signal from AND gate 201 is applied to reset bistable circuit 151 to terminate the measurement of data stored in the stores and to await the occurrence of the first data character of the next group of transmitted data characters.

Because of this ability to instantaneously determine and insert discrete spacings between the data characters in the present invention, apparatus in accordance with the present invention, while being relatively simple and inexpensive, is able to accommodate the reception of a data signal having a highly varying rate, and in this important respect is more capable than the prior art.

Voice signals after transmission over the proper channels by means of the techniques described for such transmission in the above-mentioned articles in the Bell System Technical Journal are demultiplexed and decoded at the receiving terminal. This process of decoding and demultiplexing is indicated in block form in FIG. 3 by the circuitry 210 designated by the nomenclature demultiplexed and decoded voice signals.

It is to be understood that the above-described arrangements are illustrative of the application of the principles of the invention. Numerous other arrangements may be devised by those skilled in the art without departing from the spirit and scope of the invention.

What is claimed is:

1. Apparatus for transmitting data from a data source over a predetermined channel of a multiple channel regenerative pulse code modulation transmission system comprising, in combination, a source of data characters, means at the transmitting terminal of said transmission system to store each of said data characters, means at said transmitting terminal to transmit each of said stored data characters in said predetermined channel, a plurality of storage means at the receiving terminal to store the received data, means at said receiving terminal to measure the quantity of data stored in said storage means, and means to read the data out of said stores at a rate substantially equal to the average data rate by immediately reading a first data character out of a last of said stores upon storage therein and inserting a discrete delay between every other read out data character and the next received data character, each said discrete delay being determined by the measurement of the quantity of data stored at said receiver.

2. Apparatus for transmitting data from a data source over a predetermined channel of a multiple channel regenerative pulse code modulation transmission system comprising, in combination, a source of data characters, means at the transmitting terminal of said transmission system to store each of said data characters, means at said transmitting terminal to transmit each of said stored data characters in said predetermined channel, *n* storage registers at the receiving terminal to store the received data, means at said receiving terminal to measure the quantity of data stored at the receiving terminal, means at said receiving terminal to read out a first received data character out of a last of said *n* registers immediately after storage therein and measurement of storage therein, means at said receiving terminal to generate transfer signals separated by *n* possible discrete time intervals in response to said measurements made of the quantity of data stored at said receiving terminal, and means to read out of the last of said stores each data character received after the first data character at a rate substantially equal to the average data rate under the control of said transfer signals.

3. Apparatus for transmitting data from a data source over a predetermined channel of a multiple channel regenerative pulse code modulation transmission system comprising in combination, a source of data characters, means at the transmitting terminal of said transmission system to store each of said data characters, means at said transmitting terminal to transmit each of said stored data characters in said predetermined channel, a plurality of *n* stores at the receiving terminal, means at said receiving terminal to store each received data character in a first of said stores, means to transfer the storage of each data character from said first store to a second of said stores at a predetermined time prior to the occurrence of the next data channel, means to transfer each data character from the second of said stores to a third of said stores at a predetermined time prior to the occurrence of the next data channel after the storage of a data character in said second store but prior to the transfer of a data character from said first store to said second store, means to transfer each data character stored in said third store to the fourth, fifth . . . *n*th stores at predetermined times prior to the occurrence of the next data channel following storage with transfer from a store to the next higher numbered store taking place prior to transfer of data from a lower numbered store, means responsive to the transfer signal which transfers a first received data character to said highest numbered store to activate one of a pluraltiy of $n$ delay circuits each of said $n$ delay circuits producing a predetermined signal indicative of the quantity of data stored in said stores, means to read said first data character out of said last store immediately after said determination of the quantity of data stored in said stores, means responsive to said signals generated by said delay circuits to transfer a data character stored in any of the first $n-1$ stores to the next higher numbered store and to read out a data character from the $n$th store, and means responsive to each said signal from said delay circuits to reactivate said delay circuits so that they continue to generate signals indicative of the quantity of data stored in said stores.

4. Apparatus for transmitting data from a data source over a predetermined channel of a multiple channel regenerative pulse code modulation transmission system of $f$ time slots divided into channels of $b$ bits comprising, in combination, a source of data character, means at the transmitting terminal of said transmission system to store each of said data characters, means at said transmitting terminal to transmit each of said stored data characters in $b-1$ bits of said predetermined channel and a marking pulse in the $b$th bit of said channel, a plurality of $n$ stores each capable of storing $b$ bits at the receiving terminal, gating means at said receiving terminal to store each received data character in a first of said stores, gating means to transfer the storage of each data character and its associated marking pulse from said first store to a second of said stores at a predetermined time prior to the occurrence of the next data channel, gating means to transfer each data character and its associated marking pulse from the second of said stores to a third of said stores at a predetermined time prior to the occurrence of the next data channel after the storage of a data character in said second store but prior to the transfer of a data character from said first store to said second store, gating means to transfer each data character and its associated marking pulse stored in said third store to the fourth, fifth . . . $n$th store at predetermined times prior to the occurrence of the next data channel following storage with transfer from a store to the next higher numbered store taking place prior to the transfer of data from a lower numbered store, means responsive to the transfer signal which transfers a first received data character to said highest numbered store to set a bistable circuit, means responsive to the reference voltage generated by said bistable circuit to enable a plurality of $n$ AND gates each of which is connected to predetermined output terminals of the $b$th store of each of said registers such that signals indicative of the quantity of data stored in said stores serve to activate one of a plurality of $n$ delay circuits each of said $n$ delay circuits producing a predetermined delayed signal indicative of the quantity of data stored in said $n$ stores, gating means to read said first data character out of said last store immediately after said determination of the quantity of data stored in said stores, gating means responsive to said delayed signals to transfer a data character stored in any of the first $n-1$ stores to the next higher numbered store and to read out a data character from the $n$th store, and means responsive to each said delayed signal to reactivate said $n$ AND gates so that they continue to generate delay signals indicative of the quantity of data stored in said stores.

No references cited.

ROBERT L. GRIFFIN, *Primary Examiner.*

W. S. FROMMER, *Assistant Examiner.*